Nov. 28, 1939.  G. B. GELAKOSKI  2,181,453
GAS METER READING SCOPE
Filed Oct. 20, 1938  2 Sheets-Sheet 1
Fig.1.
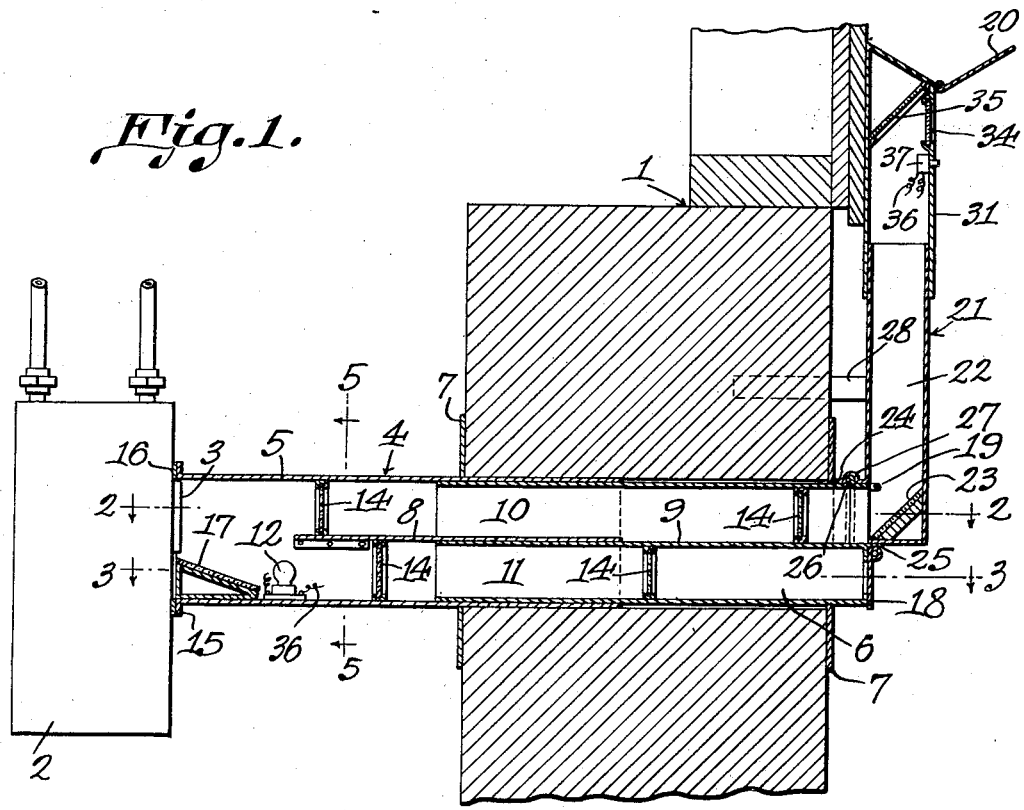
Fig.2.
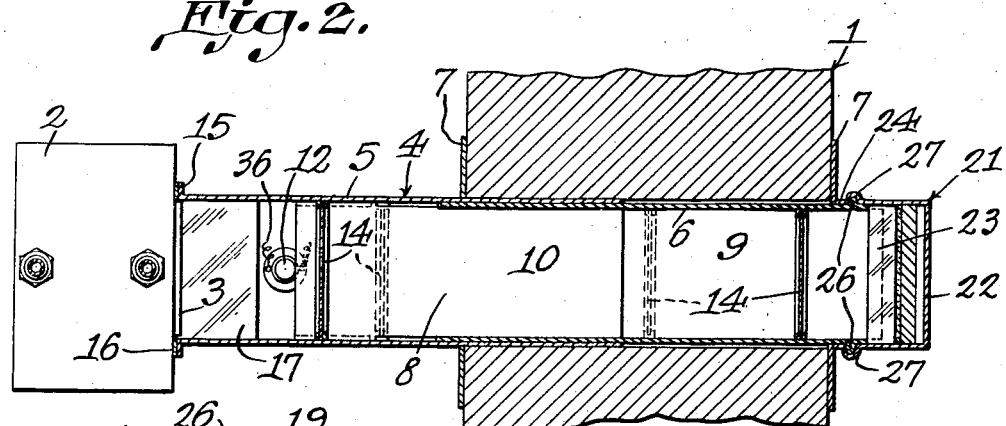
Fig.6.
George B. Gelakoski
INVENTOR.
BY *C. A. Knowles*
ATTORNEYS.

Nov. 28, 1939.    G. B. GELAKOSKI    2,181,453
GAS METER READING SCOPE
Filed Oct. 20, 1938    2 Sheets-Sheet 2
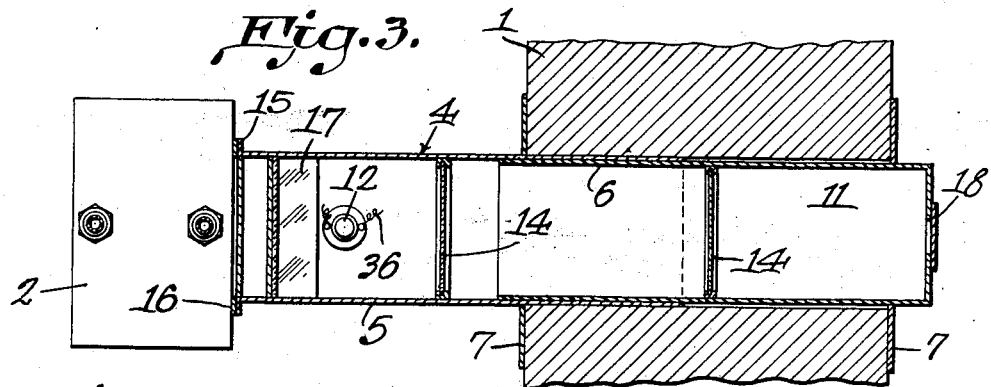
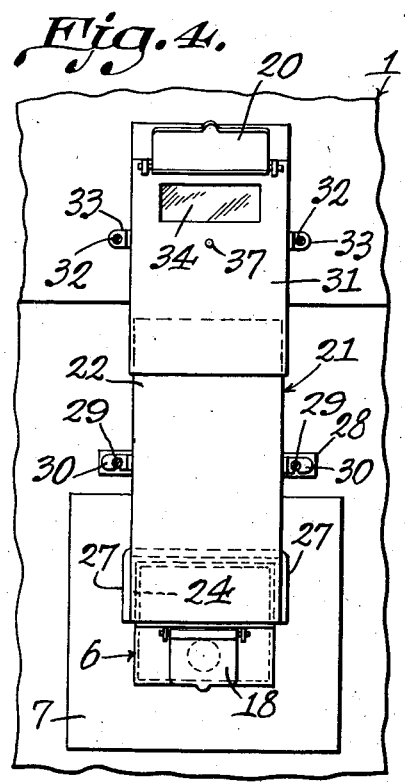
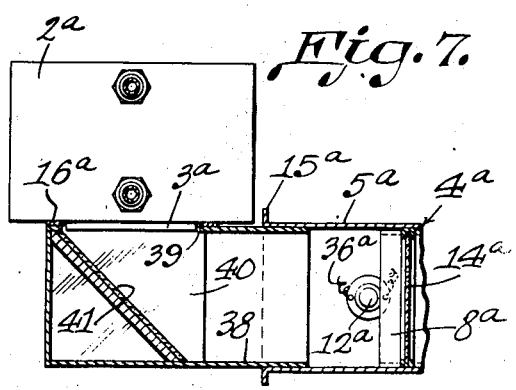
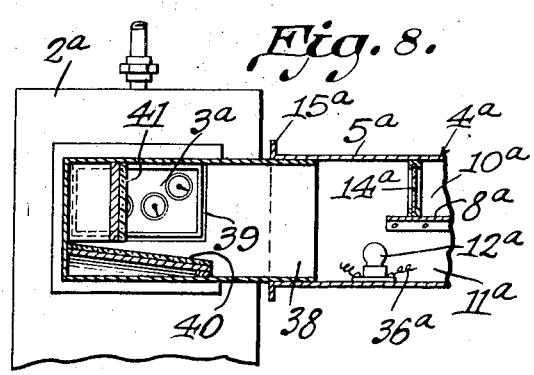
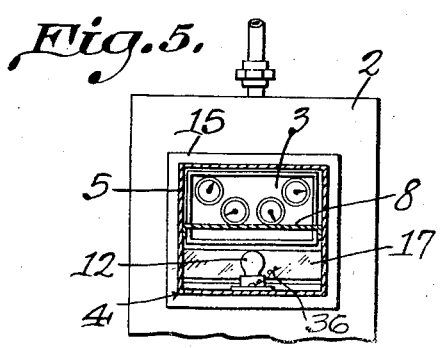
George B. Gelakoski
INVENTOR.
BY *Chknowles*.
ATTORNEYS.

Patented Nov. 28, 1939

2,181,453

UNITED STATES PATENT OFFICE 2,181,453

GAS METER READING SCOPE

George Bernhardt Gelakoski, Aurora, Ill.

Application October 20, 1938, Serial No. 236,109

1 Claim. (Cl. 88—71)

This invention aims to provide a simple but effective means whereby a meter within a building can be read conveniently from a point without the building, and from different elevations, the device being readily adapted to building walls of different thicknesses.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in a vertical section, a device constructed in accordance with the invention, assembled with a wall and with a meter;

Fig. 2 is a horizontal section, taken on the line 2—2 of Fig. 1;

Fig. 3 is a horizontal section, taken on the line 3—3 of Fig. 1;

Fig. 4 is a front elevation;

Fig. 5 is a transverse section on the line 5—5 of Fig. 1;

Fig. 6 is a fragmental vertical section, showing a portion of the inner end of the body of the periscope;

Fig. 7 is a horizontal section showing a modification, parts being broken away;

Fig. 8 is a vertical section of the structure shown in Fig. 7.

Referring to Figs. 1 to 6, the numeral 1 designates the wall of a building, there being a meter 2, such as a gas meter or an electric meter, within the building, and generally located in the basement thereof, the dial of the meter being marked by the numeral 3.

The device forming the subject matter of this application can be made, for the most part, out of any suitable metal. It comprises, as shown in Fig. 1, for instance, a horizontal body 4, extended through the wall 1. The body 4 of the periscope includes a first tubular section 5 and a second tubular section 6, telescoped with respect to the section 5, to adapt the body 4 of the periscope to the thickness of the wall 1, the sections 5 and 6 being supplied with face plates 7, which, cooperating with the vertical surfaces of the wall 1, afford tight joints.

The first section 5 of the body 4 of the periscope is supplied with a longitudinal partition 8, the second section 6 of the periscope being supplied with a longitudinal partition 9, the partitions 8 and 9 being fixed, respectively, in the section 5 of the periscope, and in the section 6 thereof.

At their inner ends, the partitions 8 and 9 are slidably overlapped on each other. The partitions 8 and 9 define, in the body 4 of the periscope, an upper sight tube 10 and a lower illuminating tube 11. The tube 11 does not serve as an illuminating tube, when recourse is had to an electric lamp 12, mounted on the bottom of the first section 5 of the periscope body 4, a little in advance of the forward or inner end of the partition 8.

Most meter inspectors carry a flashlamp, and, therefore, the fixed electric lamp 12 may be omitted. When the light is supplied by a flashlamp, the light from the flashlamp may be projected into the illuminating tube 11, by raising a hinged mounted closure 18, carried at the outer end of the periscope body 4. The light, whether proceeding from a hand flashlamp (not shown), or from the lamp 12, is received on a first reflector 17, secured in the first section of the body 4, in advance of the lamp 12, the inclination of the first reflector 17 being such that the rays of light will be cast upwardly on the face of the meter dial 3. In order to make a tight joint between the first section 5 and the meter 2, the section 5 is supplied at its inner end with an outstanding flange 15, carrying a resilient packing 16, adapted to fit closely against the meter 2.

Transparent plates 14, generally made of glass, are secured in the sections 5 and 6 of the periscope body 14 and extend across the sight tube 10 and the illuminating tube 11. The transparent plates 14 are spaced apart, and there is a dead air space between them, this construction preventing the entrance of dust, and likewise preventing frosting, steaming-up, and the like.

Fig. 6 shows, that at its outer end, the body 4 of the periscope is provided with hinge eyes 19. On the eyes 19 may be mounted a lid 20, such as the detachable lid shown in the upper right hand corner of Fig. 1.

The device as thus far described is complete in itself, for use with a hand flashlamp, instead of the fixed lamp disclosed in Fig. 1 and marked by the numeral 12. The light proceeding from the hand flashlamp is projected through the illuminating tube 11 and is received on the first reflector 17, the light being directed upwardly on the dial 3 of the meter 2, it being possible to read the meter through the sight tube 10.

It may not be convenient to read the dial 3 of the meter 2 by looking horizontally through the sight tube 10, and, in order to enable the inspector to read the dial 3, from an elevated place of observation, recourse is had to a structure next to be described.

The periscope includes a vertical upstanding arm 21, located outside the wall 1. The vertical arm 21 of the periscope includes a lower tubular member 22, closed at the bottom, and provided at its lower end with a second reflector 23, so located and pitched that it will reflect upwardly, by way of the arm 21, the illuminated image of the dial 3 of the meter 2.

The lower tubular member 22 of the periscope arm 21 is supplied with an inwardly prolonged, inverted U-shaped extension 24, which fits over the top of the outer end of the periscope body 4, the extension being prolonged downwardly, along the sides of the body 4, as far as the level of the partition 9. It can be seen in Fig. 6, that the outer end of the partition 9 forms a foot 25, on which the lower end portion of the lower tubular member 22 of the arm 21 can rest. Attention being given to Fig. 6, it will be observed that, across the top, and downwardly along its sides, the outer end of the periscope body 4 is supplied with a laterally projecting rib 26. The rib 26 is adapted to be received in a correspondingly shaped trough-like rib 27, formed on the top and on the sides of the extension 24 of the tubular member 22 of the arm 21, a tight joint being effected. A bracket 28 (Fig. 4) may be mounted on the outer surface of the wall 1, and the aforesaid bracket may include studs 29, adapted to be engaged by notched ears 30 on the sides of the lower tubular member 22 of the periscope arm 21.

It is desirable to have the arm 21 of the periscope vertically adjustable as to length, for the convenience of the reading inspector. Having this consideration in mind, the vertical arm 21 of the periscope includes an upper tubular member 31, telescoped for vertical adjustment on the lower tubular member 22 of the arm 21, but held in place against vertical movement, after adjustment, by securing elements 32 (Fig. 4) extended into the wall 1, through laterally extended ears 33 on the upper tubular member 31.

In its outer portion, and at its upper end, the upper tubular member 31 of the arm 21 carries a transparent inspection plate 34, adapted to be hidden from view by the detachable and hingedly mounted lid 20, hereinbefore referred to. Behind the inspection plate 34, is located a third reflector 35, so located and inclined, that the image of the dial 3, projected upwardly by the second reflector 23, will be received on the third reflector 35 and be made visible to an inspector, through the transparent plate 34.

The circuit for the lamp 12 is designated by the numeral 36, and in it is interposed a switch 37 (Figs. 1 and 4), mounted on the outer wall of the member 31 of the periscope arm 21. The switch 37 lies in the track of the lid 20, and when the lid 20 is closed, the switch 37 will be opened, thereby opening the lamp circuit 36. When, however, the lid 20 is opened, as in Fig. 1, the switch 37 closes, and the lamp 12 is illuminated.

In view of what has been stated hereinbefore, a detailed description of the operation of the device is unnecessary at this point. The dial 3 of the meter 2 is illuminated from the lamp 12, by way of the first reflector 17, the illuminated image of the dial 3 is received on the second reflector 23 and is projected on the third reflector 35, the image on the reflector 35 being visible through the inspection plate 34, when the lid 20 is opened.

In Fig. 1, the dial 3 of the meter 2 is at right angles to the line of sight through the tube 10, but it may not be convenient, always, to arrange the body 4 of the periscope at right angles to the dial 3. For instance, it may be necessary to have the line of sight through the tube 10 parallel to the dial 3, owing to the position of the meter 2, considered relatively to the wall 1. Under such circumstances, advantage is taken of the structure shown in Figs. 7 and 8, and in those figures, parts hereinbefore described have been designated by numerals already used with the suffix a.

One end of a sleeve 38 is telescoped for adjustment into the inner end of the first section 5a, the sleeve having a side opening 39, for the accommodation of the dial 3a, as shown in Fig. 7. A reflector 40 is fixed in the sleeve 38. The reflector 40 has an inclination both longitudinally of the sleeve 38 and transversely of the sleeve, so that the light proceeding from the lamp 12a will be reflected upwardly (Fig. 8) and transversely of the sleeve 38, upon the dial 3a. The illuminated image of the dial 3a is received on a reflector 41, secured in the sleeve 38 and so angled as to reflect the image of the dial 3a back into the sight tube 10a.

The device forming the subject matter of this application can be used on walls of any desired thickness and it accommodates itself readily to the position of the meter, it being possible for the inspector to read the meter from a standing posture without the building, it being unnecessary to stoop down in snow or mud, and it being unnecessary to read meters through basement windows, which may be frosted, steamed, dirty, or covered by snow drifts. No intricate or special lighting equipment is necessary, and the device can be used, if desired, with the usual flashlamp. Referring to Fig. 1, for instance, the operator, sighting through the tube 10, does not have to look through the glare of the lamp 12, or through the glare from a hand lamp, the rays from the hand lamp proceeding through the tube 11 to the reflector 17, and the sight tube 10 remaining dark, so far as any direct illumination from the source of light is concerned.

What is claimed is:

A device for reading an indoor meter, in standing posture, from an outdoor position, comprising a horizontal tubular body provided with transverse inner and outer face plates, the body comprising first and second sections which are telescopically assembled, to permit the face plates to cooperate with opposed surfaces of a wall, the body including an upper sight tube and a lower illuminating tube, transparent dust barriers carried by the sections and forming dead air spaces in the tubes, said spaces extending inwardly beyond the inner face plate, to permit a heating of the air in said spaces and to prevent frosting, a vertically telescopic extension at the outer end of the sight tube, an inclined reflector at the place of juncture between the extension and the sight tube, a controlled lamp in the body, at the inner end of the illuminating tube and out of the sight-line of the sight tube, and a movable closure for the outer end of the illuminating tube, whereby that tube may be illuminated by a hand lamp, optionally with respect to the controlled lamp.

GEORGE BERNHARDT GELAKOSKI.